J. OHELSKI.
AUTOMOBILE BRAKE.
APPLICATION FILED NOV. 17, 1916.
1,226,245.
Patented May 15, 1917.
2 SHEETS—SHEET 1.
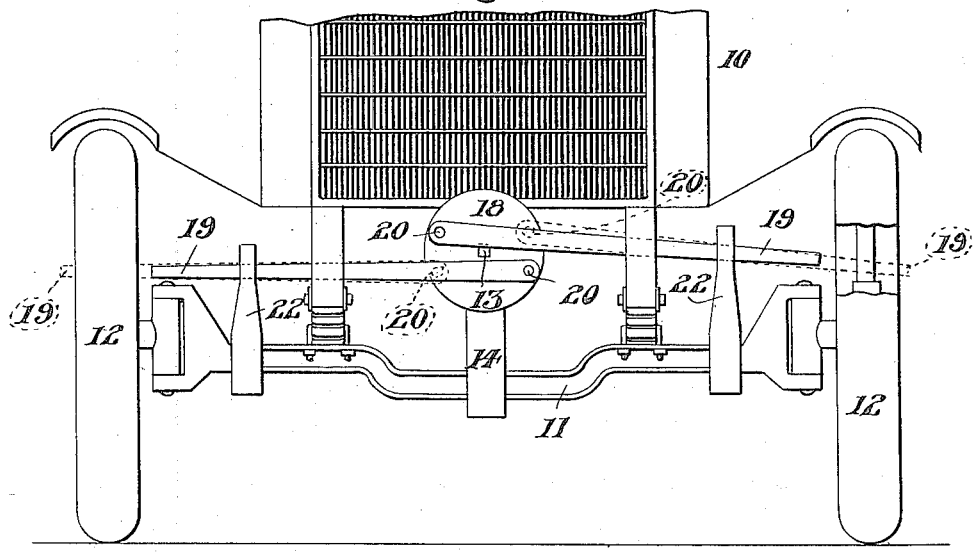
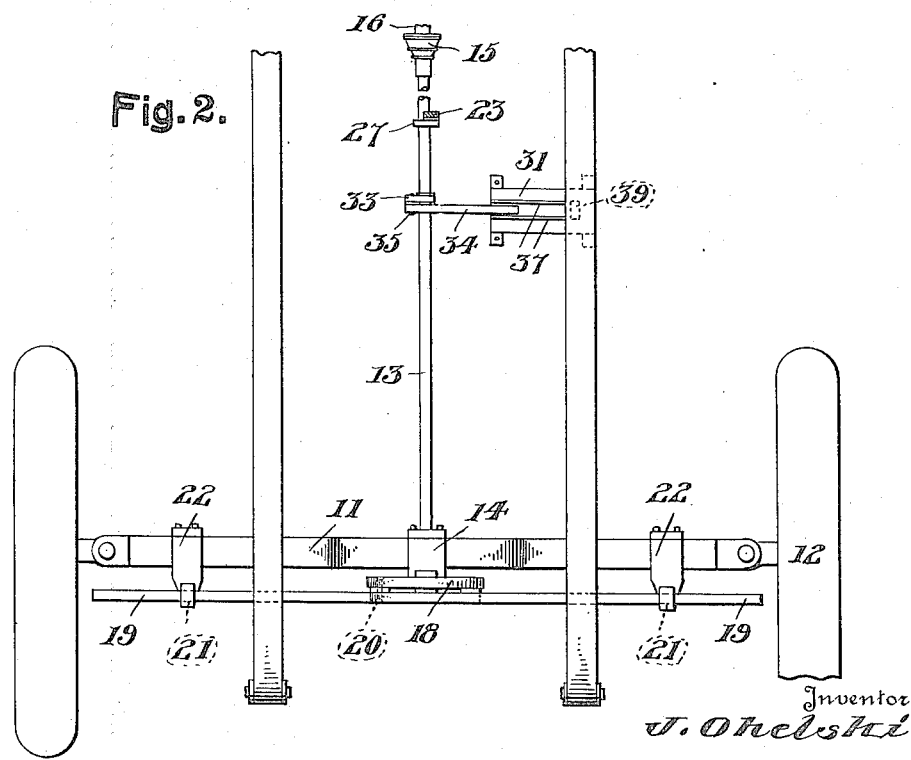

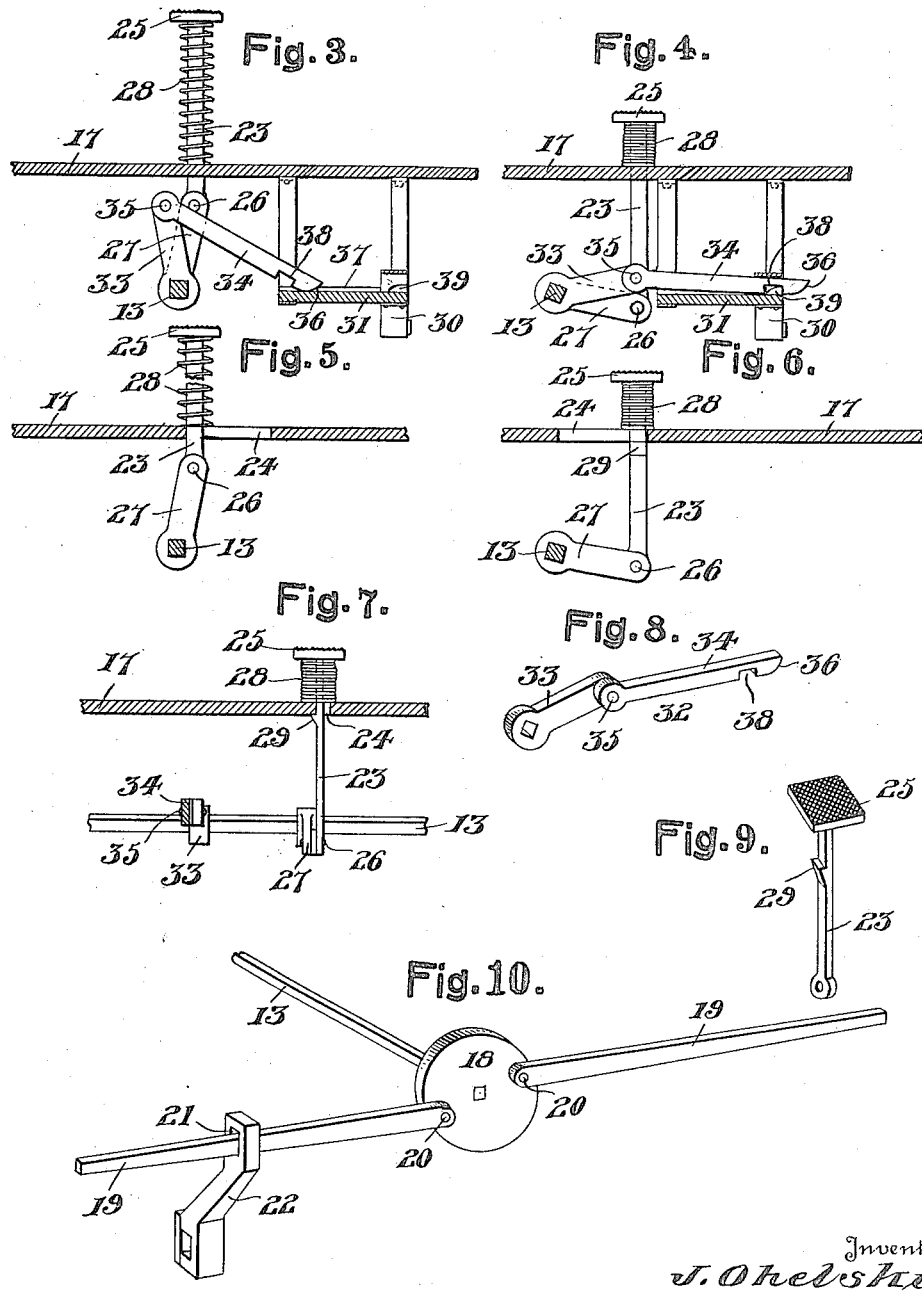

UNITED STATES PATENT OFFICE.

JOSEPH OHELSKI, OF PARSONS, PENNSYLVANIA.

AUTOMOBILE-BRAKE.

1,226,245.

Specification of Letters Patent.

Patented May 15, 1917.

Application filed November 17, 1916. Serial No. 131,930.

*To all whom it may concern:*

Be it known that I, JOSEPH OHELSKI, a citizen of the United States, residing at Parsons, in the county of Luzerne and State of Pennsylvania, have invented certain new and useful Improvements in Automobile-Brakes, of which the following is a specification.

This invention relates to certain new and useful improvements in automobile brakes.

The primary object of the invention is the provision of a brake for vehicles whereby opposite wheels thereof are prevented from revolving, thereby guarding against the stealing of the vehicle.

A further object of the device is the arrangement of a lock for the wheels of a vehicle readily operable adjacent to the driver's seat thereof whereby the wheels are prevented from turning when the device is locked, the same being easily released when desired by the operator.

A still further object of the device is the provision of a theft-preventing attachment for vehicles, arranged for locking opposite wheels of the vehicle stationary, the device being readily actuated at a distance and maintained locked until released by the owner of the vehicle and operatable at a point upon the floor thereof adjacent to the driver's seat.

In the drawings forming a part of this application and in which like-reference characters refer to corresponding parts throughout the several views, Figure 1 is a front elevation of a portion of an automobile provided with the present device, Fig. 2 is a top plan view of the forward portion of the chassis showing the present invention with parts removed and parts broken away, Fig. 3 is an enlarged detailed vertical sectional view through the floor of the vehicle showing the locking mechanism released, Fig. 4 is a view similar to Fig. 3 with the mechanism locked, Fig. 5 is a detailed sectional view through the spring pedal in its released position, Fig. 6 is a view similar to Fig. 5 with the pedal in its retaining position, Fig. 7 is a side elevation of the mechanism shown in Fig. 6 and the members adjacent thereto, Fig. 8 is a perspective view of the locking bolt member, Fig. 9 is a perspective view of the pedal detached, and Fig. 10 is a perspective view of the wheel securing means.

Referring more in detail to the drawing, the device is here illustrated in connection with an automobile 10 having a forward axle 11 provided with the forward wheels 12 carried thereby in the usual manner.

An operating shaft 13 for the device is journaled at its forward end in a bracket 14 mounted upon the axle 11, while the said shaft is provided with a universal joint 15 forming a rear section 16 of the said shaft which is suitably journaled centrally beneath the floor 17 of the automobile.

A disk 18 is secured to the forward end of the shaft 13 forwardly of the bracket 14, while locking bars 19 are pivoted as at 20 to the forward face of the disk 18 at diametrically opposite points. The said bars 19 are slidably arranged through perforations 21 in the upper ends of arms 22 secured to the axle 11, permitting the bars 19 to project through the wheels 12 between the spokes thereof when the disk 18 is turned to its operative position with the locking bars 19 substantially horizontal as best illustrated by dotted lines in Fig. 1 of the drawing.

From this arrangement it will be understood that the disk 18 and locking bars 19 are normally inoperatively positioned, as shown in Figs. 1 and 2, while a substantially one-half turn given to the shaft 13 revolves the disk 18 sufficiently to project the bars 19 to their locking position, the bars being then retractable by reversely turning the shaft 13 and disk 18 to their normal position.

A rod 23 is slidably arranged substantially vertically through a slot 24 in the floor 17 at any desired position, preferably adjacent to the driver's seat (not shown), the said rod having a pedal 25 upon its upper end while its lower end is pivoted as at 26 to the free end of arm-or-crank 27 secured to the shaft 13. By this arrangement it will be seen that with the pedal 25 normally elevated as shown in Fig. 5 of the drawing and at which times the locking bars 19 are retracted, a pressure of the foot upon the pedal 25 compresses the helical spring 28, encircling the rod 23 until a side lug 29 of the rod 23 engages beneath the floor 17 with the spring 28 fully compressed as shown in Figs. 6 and 7 of the drawing and at which times the locking bars 19 are operatively projected into engaging position with the front wheels 12 as shown by dotted lines of Fig. 1.

While the lug 29 retains the bars 19 in their locked positions it will be noted that by a slight side movement of the pedal 25 such lug is released and the spring 28 turns the shaft 13, disk 18 and locking bars 19 to their inoperative positions. It has been found desirable to lock the members of the device including the bars 19 in their retaining positions and for this purpose a suitable lock 30, such as a key-operated spring lock, is mounted upon a small frame or platform 31, carried by the floor 17 at one side of the shaft 13. A toggle bolt 32 is arranged for the lock 30 consisting of an arm portion 33 fixed to the shaft 13 and having a bolt portion 34 pivoted thereto as at 35. The free end of the bolt portion 34 is curved as at 36 for sliding upon the platform 13 between spaced guides 37 and has a keeper slot 38 for riding over the latch 39 of the lock 30 for retaining the bolt projected, and at which times the remaining mechanism of the device is in its operative retaining arrangement.

A suitable automobile theft-preventing device is provided by means of which the locking bars 19 prevent the vehicle's wheels 12 from revolving, while the lock 30 retains the said bars in their operative position, it being understood that the pedal 25 may also temporarily so retain the said bars. When the device is in its locked arrangement the latch 39 of the key lock 30 may be released and by releasing the pedal 25, the spring 28 retracting the bars 19. When the latch 39 of the lock 30 is projected, being resiliently retained as in the usual snap-lock, a pressure upon the pedal 25 projects the bolt member 34 into automatic locking engagement with the latch 39, it being understood that if the pedal lug 29 is not engaged with the side of the slot 24 at such times, a mere retracting of the latch 39 by unlocking the lock 30 effects the automatic withdrawal of the bars 19.

What I claim as new is:—

1. An attachment for vehicles comprising in combination with the front axle and forward wheels thereof, a bracket centrally mounted upon the said axle, an operating shaft longitudinally arranged beneath the vehicle journaled in the said bracket, a disk secured to the said shaft, engaging bars for the said wheels pivotally connected at their inner ends to the said disk and operating means for the said shaft.

2. An attachment for vehicles comprising in combination with the front axle and forward wheels thereof, a bracket centrally mounted upon the said axle, an operating shaft longitudinally arranged beneath the vehicle journaled in the said bracket, a disk secured to the said shaft, engaging bars for the said wheels pivotally connected at their inner ends to the said disk, a crank-arm secured to said shaft, a rod pivoted to said arm slidably extending through the floor of the vehicle, a pedal upon the free end of said rod, a return spring surrounding the said rod and retaining means for the rod when the latter is compressed with the spring under compression.

3. An attachment for vehicles comprising in combination with the front axle and forward wheels thereof, a bracket centrally mounted upon the said axle, an operating shaft longitudinally arranged beneath the vehicle journaled in the said bracket, a disk secured to the said shaft, engaging bars for the said wheels pivotally connected at their inner ends to the said disk, a crank-arm secured to said shaft, a rod pivoted to said arm slidably extending through the floor of the vehicle, a pedal upon the free end of said rod, a return spring surrounding the said rod, retaining means for the rod when the latter is depressed with the spring under compression, a snap-lock carried by the vehicle, and a toggle bolt operatively connected to the said shaft adapted for engagement with the said lock when said bolt is projected with the said bars in their operative position.

In testimony whereof I affix my signature.

JOSEPH OHELSKI.

Copies of this patent may be obtained for five cents each, by addressing the "Commissioner of Patents, Washington, D. C."